(No Model.)  2 Sheets—Sheet 1.

H. KRUTZSCH.
AIR COMPRESSOR.

No. 302,206.  Patented July 15, 1884.

Attest:
Thos. L. Jones.
Charles Pickles

Inventor:
Herman Krutzsch
by C. D. Moody atty (No Model.) 2 Sheets—Sheet 2.

H. KRUTZSCH.
AIR COMPRESSOR.

No. 302,206. Patented July 15, 1884.

Attest:
Thos. L. Jones.
Charles Pickles.

Inventor:
Herman Krutzsch
by C. D. Moody
atty

UNITED STATES PATENT OFFICE.

HERMAN KRUTZSCH, OF ST. LOUIS, MISSOURI, ASSIGNOR OF ONE-HALF TO THE ST. LOUIS IRON AND MACHINE WORKS, OF SAME PLACE.

AIR-COMPRESSOR.

SPECIFICATION forming part of Letters Patent No. 302,206, dated July 15, 1884.

Application filed March 6, 1883. (No model.)

*To all whom it may concern:*

Be it known that I, HERMAN KRUTZSCH, of St. Louis, Missouri, have made a new and useful Improvement in Air-Compressors, of which the following is a full, clear, and exact description, reference being had to the annexed drawings, making part of this specification, in which—

Figure 1:
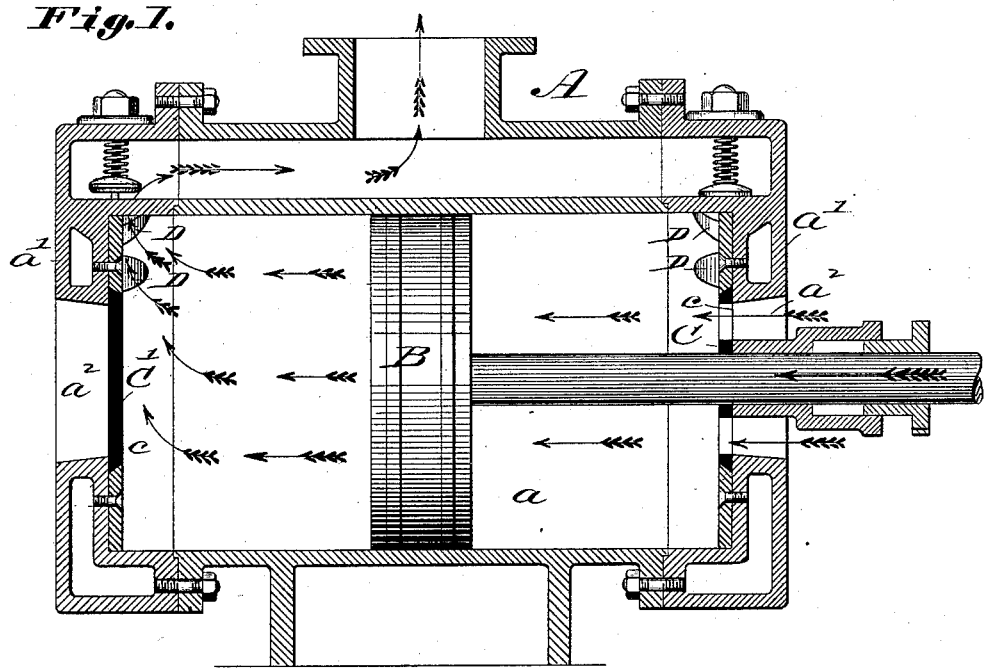
Figure 2:
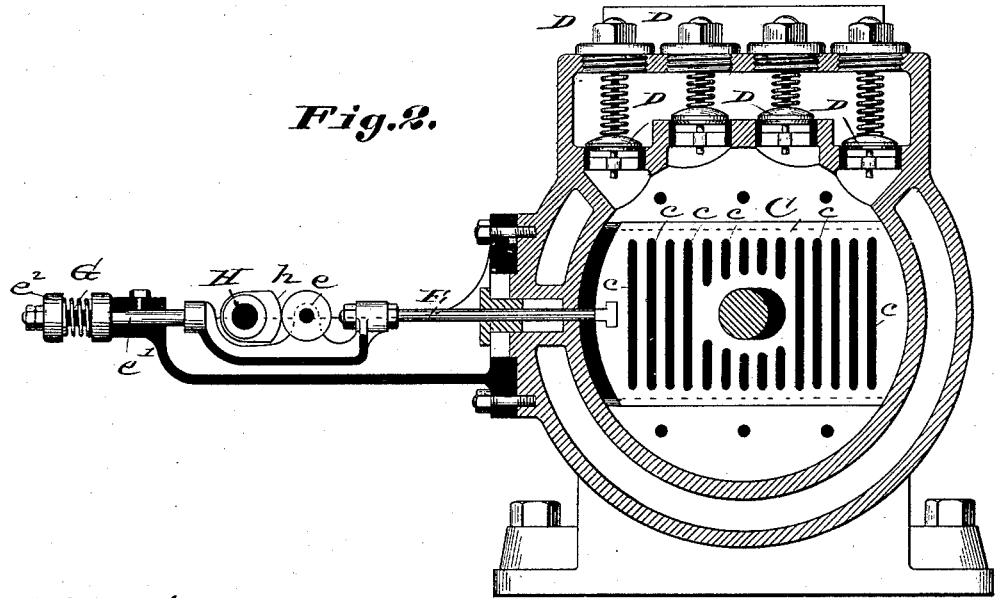
Figure 3:
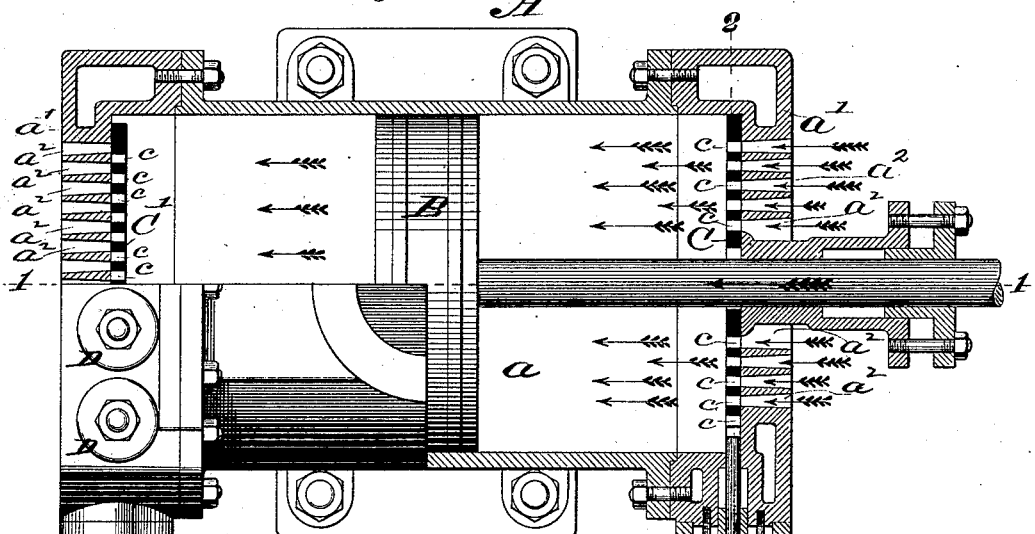
Figure 4:
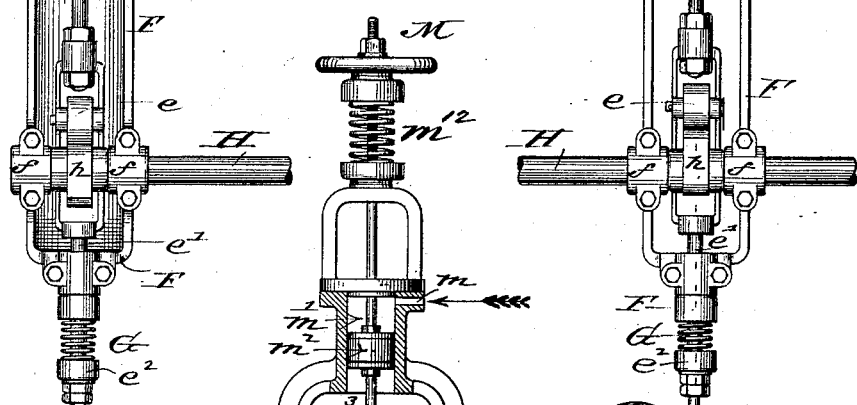

Figure 1 is a longitudinal section taken on the line 1 1 of Fig. 3; Fig. 2, a cross-section on the line 2 2 of Fig. 3; Fig. 3, a plan partly in horizontal section; Fig. 4, a vertical section taken through the governor, and Fig. 5 a section on the line 5 5 of Fig. 4.

The same letters denote the same parts.

The present invention relates mainly to the supply-valves of the compressor. It also has reference to the mode of regulating the compressor.

A, Figs. 1, 2, 3, represents an air-compressor in which the improvement is embodied. Aside from its improved features, the compressor may be of the usual form.

B represents the piston.

C C' represent the valves for admitting the air into the compressor-cylinder $a$, and D D D the discharge-valves. The peculiarity of the supply-valves C C' is their being made in form of slides and adapted to slide past an opening or openings in the cylinder-heads $a'$ $a'$, the slides having an opening or openings corresponding to those in the cylinder-heads, and the air being admitted into the cylinder when the slide-openings are in coincidence with the cylinder-head openings. The best results are obtained when the valve and cylinder have manifold openings, substantially as shown and more distinctly in Figs. 2 and 3—that is, the cylinder-heads $a'$ $a'$ each have a series of openings, $a^2$ $a^2$ $a^2$, and the supply-valves each have a corresponding series of openings, $c$ $c$ $c$, and to open the supply-valves they are moved across the cylinder-heads until the openings $c$ $c$ $c$ are respectively brought into coincidence with the openings $a^2$ $a^2$ $a^2$, and to close the valves they are moved to bring the openings $c$ $c$ $c$, respectively, out of coincidence with the openings $a^2$ $a^2$ $a^2$. The aim and effect of this is to rapidly open and close the supply-valves, and this is very desirable in an air-compressor, for, if practicable, the air-supply valves should work simultaneously with the reversing of the cylinder-piston. At the moment the piston starts on its stroke the supply-valve in the rear of the piston should be thrown wide open and the supply-valve in front of the piston should be fully closed. The manifold-opening system described provides for obtaining this result with a minimum movement of the supply-valves, and the remaining thing to effect is to produce their minimum movement in the shortest practicable time. To this end the supply-valves are each operated by the device shown in Figs. 2, 3.

E is the supply-valve stem. It is provided with a friction-roller, $e$, and it is extended at $e'$ to work in a guide, F, and beyond the guide a spring, G, encircles the stem, the spring bearing at one end against the guide and at the other end against a shoulder, $e^2$, upon the stem, and serving to press the valve-stem and valve to the left, as shown in Fig. 2.

H represents a shaft rotating in bearings $f f$ in the guides F F and carrying the cams $h$ $h$. These cams operate in connection with the friction-rollers $e$ $e$, and their function is, by bearing against the rollers, to move the valve-stems and valves to the right, as shown in Fig. 2. The cams are shaped, substantially as shown, to move the valves, when once started, in the shortest possible time, and when the cams are operating the springs G G yield; but as soon as the cams pass the rollers the springs act to move the valves in the opposite direction. The valves are preferably opened by the cams and closed by the springs. The compressed air escapes past the discharge-valves D D D to the receiver, which, being of the usual form and well understood, is not shown in the drawings.

Figure 5:
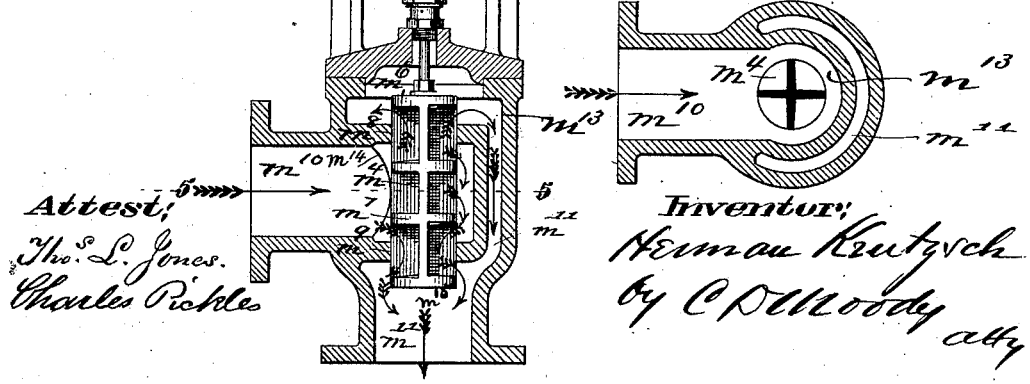

To prevent an over-pressure in the receiver, the latter is connected with the governor M, Figs. 4, 5. The inlet from the receiver into the governor is at $m$. The air passes from the inlet into the space $m'$ above the piston $m^2$, which is attached to the rod $m^3$. This rod, including the piston $m^2$ and valve $m^4$, is balanced by means of the spring $m^{12}$, to suit the desired pressure in the air-receiver. If an excessive pressure exists in the air-receiver, the piston and rod $m^3$ are forced downward, which movement causes the parts $m^6$ $m^7$ of the valve $m^4$ to approach the seats $m^8$ $m^9$, respectively, and thereby reduce the current of steam which enters at $m^{10}$, and when the valve is open passes through the passage $m^{11}$ to the steam-engine (not shown) used in operating the compressor-piston. This causes the movement of the compressor-piston to slacken and the pressure in the air-receiver to fall. The pressure upon the governor-piston $m^2$ then relaxes and the steam-valve $m^4$ opens again to the normal position. Should an accident occur to the air-receiver and the pressure therein be suddenly relieved, the counter-balance $m^5$ acts to lift the valve and seat the parts $m^{14}$ $m^{15}$ of the valve at $m^8$ $m^9$, respectively, and thereby cut off the steam passing to the steam-engine. The valve $m^4$ works in the chamber $m^{13}$.

I claim—

1. The combination of the air-compressor cylinder $a$, the ends $a'$ $a'$ of which have centrally across the face a series of openings, $a^2$ $a^2$ $a^2$, and the transversely-rectilinear reciprocating slide-valves C C', having the series of openings $c$ $c$ $c$, and the discharge-valves D, substantially as described.

2. In combination with the cylinder A, the guides F F, the valves C C', the stems E E, the rollers $e$ $e$, the springs G G, the shaft H, and the cams $h$ $h$, substantially as described.

3. In an air-compressor, the combination of a cylinder in which works a piston, and having both its heads perforated, centrally-perforated and transversely-reciprocating valves applied to these heads, cams and springs applied to the valve-stem for giving quick motion to the valve, and vertically-movable spring-actuated discharge-valves D in the cylinder $a$, all constructed and adapted to operate as described.

Witness my hand this 22d February, 1883.

HERMAN KRUTZSCH.

Witnesses:
C. D. MOODY,
CHARLES PICKLES.